United States Patent [19]
Lautner et al.

[11] 3,915,519
[45] Oct. 28, 1975

[54] LUBRICATING BEARING

[75] Inventors: Max E. Lautner, Watertown; John H. Jenkins, Dexter, both of N.Y.

[73] Assignee: Gould Inc., Chicago, Ill.

[22] Filed: Mar. 11, 1974

[21] Appl. No.: 449,859

[52] U.S. Cl. ............................ 308/132; 308/72
[51] Int. Cl. ...... F16c 1/24; F16c 13/06; F16c 33/78
[58] Field of Search ......... 308/72, 78, 93, 107, 122, 308/132, 170, 237 R

[56] References Cited
UNITED STATES PATENTS

| | | | |
|---|---|---|---|
| 3,336,092 | 8/1967 | Dochterman | 308/132 |
| 3,423,138 | 1/1969 | Hardy | 308/132 |
| 3,669,517 | 6/1972 | Hughes | 308/122 |
| 3,745,391 | 7/1973 | Dochterman | 308/132 X |

*Primary Examiner*—M. Henson Wood, Jr.
*Assistant Examiner*—Howard Beltran
*Attorney, Agent, or Firm*—Bruns & Jenney

[57] ABSTRACT

A small, shaded pole, single phase, electric motor has a rotatable shaft journalled in bearings of the sintered metal oil-absorbing type. An annular felt disk around each bearing is impregnated with oil to supply lubricant to the bearing. Each disk is secured in a housing around the bearing. The motor shaft has a pair of small spaced annular grooves therearound at the center of each bearing and oppositely spiraling small helical grooves each terminating in one of the annular grooves extend from the axial ends of the bearing, the direction of the spiral being such in relation to the direction of rotation of the shaft as to pump lubricant from the ends of the bearing to an area of high oil pressure between the annular grooves. A passage through the bearing extending radially of the shaft connects the area of high oil pressure to the felt disk for returning lubricant from the area of high oil pressure to the disk where it is filtered by the disk and absorbed therein.

1 Claim, 4 Drawing Figures

LUBRICATING BEARING

BACKGROUND OF THE INVENTION

This invention relates generally to a lubricant loss-prevention means for a bearing about a rotating shaft and relates in particular to means for preventing oil from leaking axially of the shaft from a bearing of the sintered metal, oil absorbing type.

In mechanical assemblies having a bearing of the so-called self-lubricating kind, the lubricant may leak from the annular space between the bearing and the journal portion of the shaft, the lubricant escaping axially of the shaft. The lubricant may be spun out by the shaft itself or it may follow the shaft to be spun out by a radially projecting device such as a pulley or a rotor.

Though care in manufacture may provide for a shaft and bearing without such a leak, any one of a number of things such as a spiral scratch on the shaft, a tapered bore in the bearing, a slightly bent or oval shaft, or a wetting agent on the shaft acquired during assembly, may cause an oil leak. If only one or two percent of shaft and bearing assemblies develop an oil leak it may be objectionable for certain uses where the assembly is substantially inaccessible as in refrigeration or other complicated apparatus.

Small subfractional horsepower motors, in particular, are often used to power fans in such apparatus and a malfunction of such a motor, due to loss of lubricant from a bearing, can cause a large operation to be shut down until this small motor can be reached and replaced. Such small motors are also often in critical areas where a spin-off of even a few drops of oil can cause a malfunction of the apparatus of which the motor is a part.

SUMMARY OF THE INVENTION

This invention contemplates providing oil pump means on the journal portion of the shaft comprising helical grooves of opposite thread arranged, with respect to the direction of rotation of the shaft, so as to pump oil from the axial ends of the bearing toward the center of the bearing, the helical or spiral grooves terminating at the center of the bearing in spaced annular grooves serving as oil pressure grooves. Such spiral type pumps are sometimes called Holweck pumps.

The annular space, however minute, between the bearing and the shaft journal between the pressure grooves becomes a high pressure area, when the shaft rotates. A passage through the bearing radial of the shaft provides pressure relief means in that oil or other lubricant may escape through the passage to a reservoir area around the bearing.

The invention is peculiarly adapted for use in subfractional electric motors usually used to drive fan means in more complicated apparatus. Such motors have self-lubricating bearings, the bearings being of sintered metal providing capillary paths for the passage of oil through the bearing. Lubricant is provided by an annular pad of felt, or other absorbent material, closely fitting around the sintered bearing. A housing is provided around the pad for each bearing and the bearing is usually of the floating or self-aligning type permitting a close fit between journal and bearing.

Such an arrangement is suitable for the pump and passage combination described above in that oil from the passage is filtered by the pad as it is pumped therein and absorbed. The pad, being supplied with oil whenever the motor runs, keeps the bearing supplied with lubricant for an increased period of time whereby the life of the motor is increased.

DESCRIPTION OF THE PREFERRED EMBODIMENT

Figures 1, 2:
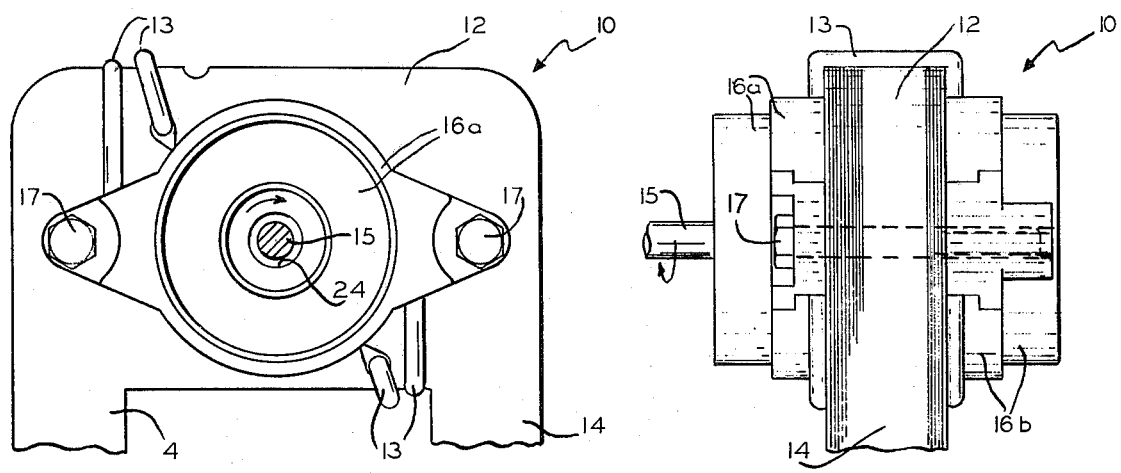
FIG. 1 and FIG. 2 are fragmentary side elevational views of an electric motor according to the invention, FIG. 2 being a view rotated 90° from that of FIG. 1.

Referring to FIGS. 1 and 2, a shaded pole, single phase, sub-fractional electric motor 10 has a laminated stator member 12 shown fragmentarily. The shaded poles are created by coils indicated at 13, FIG. 1. It will be understood that the sides 14 of stator 12 continue downward, as indicated in FIG. 1, to a core piece, not shown secured between the sides 14 and around which a coil is wound.

A shaft 15, adapted to rotate in the direction indicated by arrows, carries a rotor, not seen in FIGS. 1 and 2, rotatable in a suitable aperture in the stator 12. Bearing housings 16a and 16b are secured by bolts 17 extending through suitable holes through stator 12 to the stator, as shown, by clamping the housings against the stator.

Figure 4:
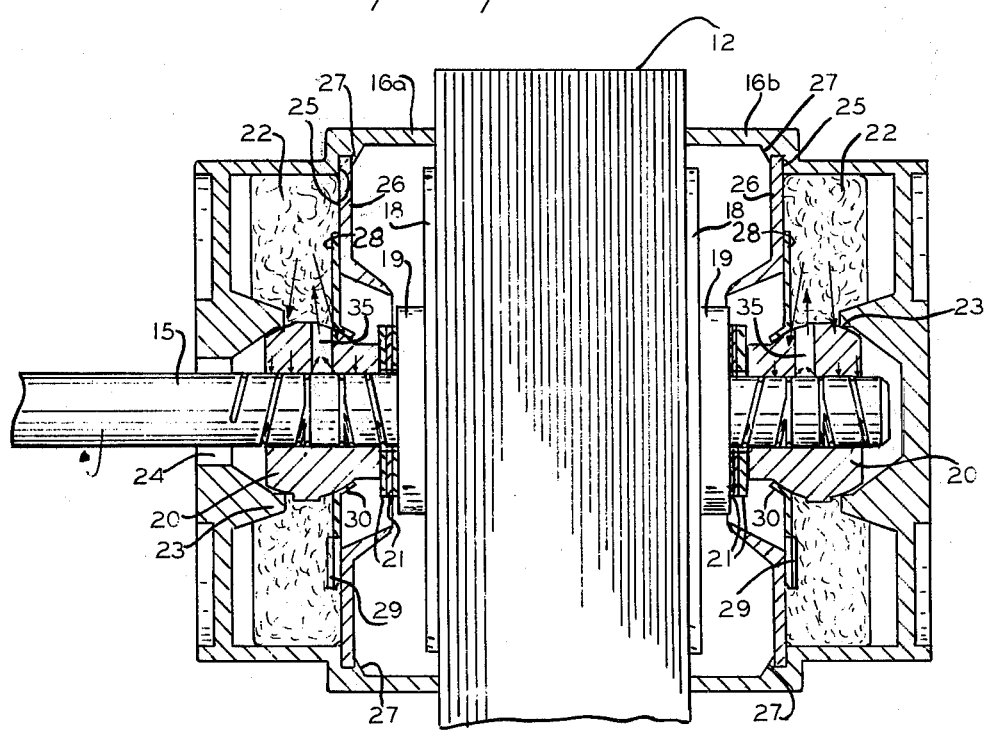
FIG. 4 is an enlarged view of a motor similar to FIG. 2 but with the bearings, bearing housings and associated parts in section showing an embodiment of the invention.

Referring to FIG. 4, a rotor 18, secured to shaft 15, by means not shown, has hub portions 19. Bearings 20 around the shaft 15 are spaced from the hub portions 19 by suitable thrust washers and spacers at 21.

Bearings 20, it will be understood, are of the sintered metal type having fine pores therein, not shown, forming capillary passages for lubricant through the bearings from oil-impregnated annular felt disks 22 secured around bearings 20 in each housing. Bearings 20 are each self-aligning, having semi-spherical portions at either end.

Bearing housings 16a and 16b have annular portions 23 in their end faces in contact with one semi-spherical bearing portion, the end face of housing 16a having a suitably large hole 24 through which shaft 15 projects.

Housings 16a and 16b are stepped, as shown forming a shoulder 25 against which an annular washer 26 is secured by staking down a portion of the thickened wall of each housing at 27, as shown. Inside each washer 26, a spring washer 28 secures the disk 22 in place, each spring washer having resilient tongues 29 projecting spirally and axially therefrom for biasing the disk against the annular portion 23 of the housing. Each spring washer 28 also has an annular portion 30 in contact with the other semi-spherical bearing portion, whereby bearings 20 may swivel and align themselves with shaft 15.

Figure 3:
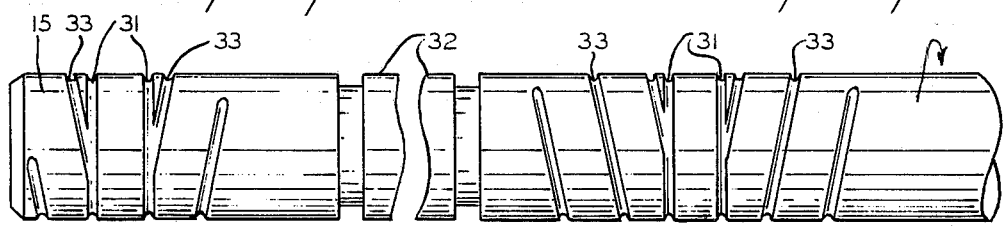
FIG. 3 is a greatly enlarged fragmentary plan view of the shaft shown in FIGS. 1 and 2.

Referring to FIG. 3, shaft 15 has a spaced pair of annular grooves 31 therearound on each side of the portion 32 which is adapted to have the rotor 18 secured thereon. Helical grooves 33 in the shaft extend from each groove 31 oppositely threaded. Each groove 33 extends in a helical direction or is threaded, with respect to the direction of rotation of the shaft, so as to pump oil from an axial end of the bearing to an annular groove 31, the annular grooves being located at the center of the bearing 20, as shown in FIG. 4. Because of friction and inertia the oil will tend to rotate slower than the shaft and, following the grooves 33, will build up in an area of high oil pressure between the pairs of grooves 31.

A passage 35 is provided in each bearing extending radially of the shaft and connecting the area of high oil pressure between grooves 31 with the felt disk 22. This recycles the oil collected from the axial ends of bearing 20 to the oil reservoir of disk 22, the oil being filtered as it passes through the disk.

While the grooves 33 are shown in shaft 15, lubricant pump means comprising helically extending grooves in a bearing about a rotating shaft are also known and it will be understood that helical grooves may alternatively be formed in the bearing. Due to ease in manufacture, however, the preferred embodiment is believed to be as described above.

It will also be apparent that the lubricant loss-prevention means described above may also be used with silicone lubricants where their use is ordinarily impractical because of their characteristics which makes difficult their control as lubricants at the bearing with which they are used.

1. In combination, a bearing of the sintered metal type having lubricant carrying capillary passages therein, a rotatable shaft in the bearing, the bearing having a housing at least partially therearound, and lubricant-absorbent material in the housing in contact with the bearing for supplying lubricant to the bearing, the shaft having a spaced pair of helically extending grooves between the bearing axial ends, each groove originating beyond the bearing axial ends and terminating in an annular groove in the shaft in the area at the center of the bearing between the bearing axial ends, the helical grooves extending in opposite helical directions with respect to the direction of shaft rotation for pumping lubricant toward the area at the center of the bearing and thereby there forming a high pressure area, the bearing having a relatively large lubricant passage in registry with the high pressure area extending through the bearing radially of the shaft for the escape of oil from the high pressure area back to the lubricant absorbent material in the housing when the shaft is rotating.

* * * * *